US009797603B2

(12) United States Patent
Bannister et al.

(10) Patent No.: US 9,797,603 B2
(45) Date of Patent: Oct. 24, 2017

(54) HEATING SYSTEM—MODULAR

(75) Inventors: John J Bannister, Derbyshire (GB);
Geoffrey M Barker, Cheshire (GB);
Iain Henshaw, Manchester (GB);
Timothy Whitechurch, Cheshire (GB);
Neil S. Bright, Stratford-upon-Avon (GB)

(73) Assignee: Energetix Genlec Limited (GB)

( * ) Notice: Subject to any disclaimer, the term of this patent is extended or adjusted under 35 U.S.C. 154(b) by 199 days.

(21) Appl. No.: 13/883,021

(22) PCT Filed: Nov. 2, 2011

(86) PCT No.: PCT/GB2011/052127
§ 371 (c)(1),
(2), (4) Date: May 2, 2013

(87) PCT Pub. No.: WO2012/059752
PCT Pub. Date: May 10, 2012

(65) Prior Publication Data
US 2013/0219894 A1    Aug. 29, 2013

(30) Foreign Application Priority Data
Nov. 2, 2010   (GB) .................................. 1018483.6

(51) Int. Cl.
*F24D 3/08*      (2006.01)
*F01K 17/02*     (2006.01)
(Continued)

(52) U.S. Cl.
CPC ............... *F24D 3/08* (2013.01); *F01K 17/02* (2013.01); *F01K 23/04* (2013.01); *F01K 25/08* (2013.01);
(Continued)

(58) Field of Classification Search
CPC . F24D 3/08; F24D 11/00; F24D 17/00; F01K 25/08
See application file for complete search history.

(56) References Cited

U.S. PATENT DOCUMENTS 4,875,436 A * 10/1989 Smith ................ B01D 53/8631
122/468
5,241,817 A *  9/1993 George, Jr. ............. F01C 20/04
60/39.182
(Continued)

FOREIGN PATENT DOCUMENTS

CA      2714644 A1    8/2009
EP      0093826 A1   11/1983
(Continued)

OTHER PUBLICATIONS

International Search Report and Written Opinion for PCT/GB2011/052127 mailed Apr. 3, 2013.
(Continued)

*Primary Examiner* — Mark Laurenzi
*Assistant Examiner* — Shafiq Mian
(74) *Attorney, Agent, or Firm* — Taft Stettinius & Hollister, LLP; Ryan O. White

(57) ABSTRACT

A boiler unit comprises an enclosure including: a first circuit of a first fluid heat exchange medium, the first circuit having a heating device to heat the first medium, a boost heat exchanger, a valve and a first manifold; a second circuit of a second heating system fluid heat exchange medium, the second circuit having a flow and return port of the boiler unit, a second manifold and said boost heat exchanger for exchange of heat between said first and second heat exchanger media when said valve is open; a space in the enclosure receiving an auxiliary unit to be driven substantially exclusively by said first fluid heat exchange medium; and a boiler control unit to control operation of the heating
(Continued)

device according to heat demand of the heating device and otherwise irrespective of the auxiliary unit when connected; and an organic rankine cycle (ORC) unit comprising: a third fluid heat exchange medium circuit, the circuit including a condenser adapted for connection to said second manifold to provide heat to said second circuit, a pump to circulate said third medium, an evaporator adapted for connection to said first manifold to heat said third medium and a rotary expander connected to an electricity generator; and an auxiliary control unit to control the ORC unit and operate said valve.

7 Claims, 14 Drawing Sheets

(51) Int. Cl.
- F01K 23/04 (2006.01)
- F01K 25/08 (2006.01)
- F24D 12/02 (2006.01)
- F24D 17/00 (2006.01)
- F24H 9/14 (2006.01)
- F24H 9/06 (2006.01)
- F24D 11/00 (2006.01)

(52) U.S. Cl.
CPC ............. *F24D 11/00* (2013.01); *F24D 12/02* (2013.01); *F24D 17/00* (2013.01); *F24D 17/001* (2013.01); *F24H 9/06* (2013.01); *F24H 9/148* (2013.01); *F24D 2200/18* (2013.01); *F24H 2240/12* (2013.01); *Y02B 30/108* (2013.01); *Y02B 30/14* (2013.01); *Y02B 30/16* (2013.01); *Y02B 30/52* (2013.01); *Y02E 20/14* (2013.01)

(56) References Cited

U.S. PATENT DOCUMENTS

| | | | | |
|---|---|---|---|---|
| 6,290,142 | B1* | 9/2001 | Togawa | F02G 5/00 165/299 |
| 6,598,397 | B2* | 7/2003 | Hanna | F01K 17/02 60/651 |
| 8,544,273 | B2* | 10/2013 | Brenmiller | F03G 6/067 60/641.8 |
| 8,578,714 | B2* | 11/2013 | Nagurny | F01K 13/00 60/645 |
| 2002/0189173 | A1 | 12/2002 | Staschik | |
| 2003/0213246 | A1* | 11/2003 | Coll | F01K 17/02 60/653 |
| 2003/0213854 | A1* | 11/2003 | Stickford | F01K 17/02 237/12.1 |
| 2004/0226296 | A1* | 11/2004 | Hanna | F01K 17/02 60/671 |
| 2004/0255593 | A1* | 12/2004 | Brasz | F02C 6/18 60/772 |
| 2005/0183421 | A1* | 8/2005 | Vaynberg | F01K 25/08 60/641.8 |
| 2008/0289313 | A1* | 11/2008 | Batscha | F01K 25/08 60/39.5 |
| 2009/0320828 | A1* | 12/2009 | Koketsu et al. | 126/585 |
| 2010/0034684 | A1* | 2/2010 | Ast | F01K 21/005 418/84 |
| 2010/0326076 | A1* | 12/2010 | Ast | F01K 23/04 60/671 |
| 2011/0048002 | A1* | 3/2011 | Taylor | F01K 23/10 60/605.2 |
| 2011/0289953 | A1* | 12/2011 | Alston | B60H 1/32 62/238.6 |
| 2012/0100062 | A1* | 4/2012 | Nakamura | C01B 3/025 423/359 |
| 2012/0135321 | A1* | 5/2012 | Devriendt | F24D 12/02 429/410 |

FOREIGN PATENT DOCUMENTS

| | | |
|---|---|---|
| EP | 1421259 B1 | 5/2004 |
| GB | 2376271 A | 12/2002 |
| GB | 2406901 B | 12/2007 |
| GB | 2465767 B | 1/2011 |
| WO | WO 2004101982 | 11/2004 |
| WO | WO 2010/061190 A2 | 6/2010 |

OTHER PUBLICATIONS

UK Search Report of priority application No. GB1018483.6 dated Mar. 7, 2011.

* cited by examiner

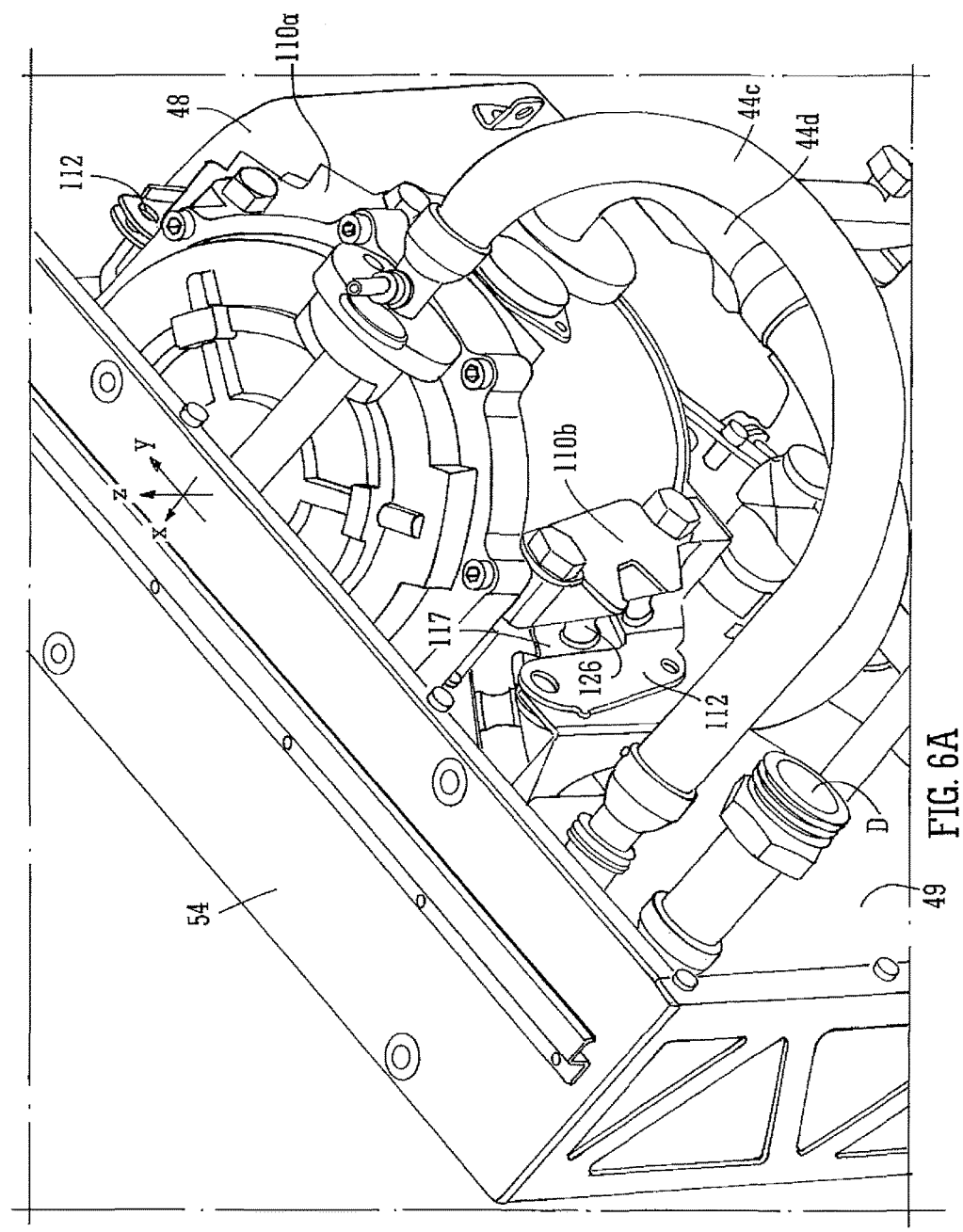

HEATING SYSTEM—MODULAR

This application is a U.S. national stage application under 35 U.S.C. §371 of PCT International Application Serial No. PCT/GB2011/052127, which has an international filing date of Nov. 2, 2011, designates the United States of America, and claims the benefit of GB Application No. 1018483.6, which was filed on Nov. 2, 2010. The disclosures of each of these prior applications are hereby expressly incorporated by reference in their entirety.

This invention relates to a modular heating system. In particular to a domestic heating system, or a system of generally small capacity, that has the capability of performing additional functions. It also relates to a mounting arrangement for a vibratory component, especially of a pump or motor in a domestic heating system.

BACKGROUND

Domestic heating systems generally involve a unit that is euphemistically described as a boiler, and which may be wall mounted or self-standing. It is generally the central unit of the heating system, and the output is generally hot water that is used either indirectly for heating a hot water circuit (for hot water dispensed from taps and showers), usually referred to as DHW, and directly, for space, or central, heating of the building in which the boiler is located, usually referred to as CH. Of course, direct supply of DHW is also possible in "combi" arrangements.

The source of power for such boilers may be gas or another fuel or another source.

Increasingly there is a demand for local electricity generation and the economics of such generation are beginning to make sense. WO-A-2003/014534 describes an integrated micro combined heat and power (CHP) system, in which a conventional boiler is provided with a steam circuit that provides heat to an organic rankine cycle (ORC) machine that employs a scroll as the expander, the scroll driving a generator to generate electricity. The present invention relates especially, although not exclusively, to such an arrangement.

However, there are also other potential capabilities required of a boiler such as provision within the appliance of a thermal store, or of an air conditioning unit, for example. Also, it is desirable to render boilers adaptable.

WO-A-2010/061190 discloses a boiler unit housed in an enclosure configured to receive a solid state combined heat and power unit or a rankine or stirling engine (CHP device), wherein the boiler unit comprises a heat generating device and a control unit to independently control the heat generating device and the CHP device, wherein the boiler unit is operable without the CHP device being present.

GB-A-2376271 discloses a similar arrangement.

BRIEF SUMMARY OF THE DISCLOSURE

In accordance with the present invention there is provided a boiler unit comprising an enclosure including:
 a first circuit of a first fluid heat exchange medium, the first circuit having a heating device to heat the first medium, a boost heat exchanger, a valve and a first manifold;
 a second circuit of a second heating system fluid heat exchange medium, the second circuit having a flow and return port of the boiler unit, a second manifold and said boost heat exchanger for exchange of heat between said first and second heat exchanger media when said valve is open;
 a space in the enclosure receiving an auxiliary unit to be driven substantially exclusively by said first fluid heat exchange medium and comprising a heat drain; and
 a boiler control unit to control operation of the heating device according to heat demand of the heating device and otherwise irrespective of the auxiliary unit when connected.

Said auxiliary unit being "driven substantially exclusively by said first fluid heat exchange medium" means that no additional power beyond any control of the auxiliary unit is employed by the auxiliary unit, which derives its energy required to perform its substantive purpose exclusively from said first fluid heat exchange medium. Thus the present invention employs a single source of heat for both the second circuit, which might conveniently be the domestic hot water and central heating circuit of a residence or building, and the auxiliary unit. This renders control of the appliance relatively very simple, requiring only traditional boiler heating controls with which an existing skilled person (for example a CORGI registered fitter in the United Kingdom) would be familiar.

Said auxiliary unit may comprise an organic rankine cycle (ORC) unit comprising:
 a third fluid heat exchange medium circuit, the circuit including a condenser adapted for connection to said second manifold to provide heat to said second circuit, a pump to circulate said third medium, an evaporator forming said heat drain and adapted for connection to said first manifold to heat said third medium and a rotary expander connected to an electricity generator; and
 an auxiliary control unit to control the ORC unit and operate said valve.

In this mode, a boiler incorporating an ORC unit is a micro CHP unit where all the energy delivered (ie heat and electricity) is provided by said heating device. In one arrangement, the heating device is a combustion chamber incorporating a heat exchange coil for transmitting heat from combustion products to said first heat exchange medium. A feature of the present invention can be that the boost heat exchanger is sufficient to transfer substantially all of the heat delivered by the first heat exchange medium to the second heat exchange medium. This means that, when the ORC unit is not connected, there is no loss of heat capacity of the system.

The auxiliary unit is simply another heat load on the system, so the boiler control is unaffected by its inclusion. Of course, whatever unit is installed has its own control, which does integrate with the first and second circuits to some extent in operating the boost exchanger valve in the first circuit.

Moreover, when the auxiliary unit, whatever it is, is not connected, the valve is normally open, the auxiliary control unit serving to close the valve so that heat of the first heat exchange fluid can transfer to the third heat exchange medium. Preferably, when the auxiliary unit is an ORC unit and it is connected in the boiler unit, the valve is closed until the ORC unit cannot meet all the heat demand of the second heat exchanger.

Thus, the system is heat-led. When started, the boiler transfers all heat called for by the second circuit to the first heat exchange fluid and then to the third heat exchange fluid, said valve being closed by the ORC control unit. Indeed, more heat is generated than necessary for the second circuit, the excess being used by the ORC unit to generate electricity. The ORC unit is rated to deliver the anticipated average functioning heat load of the second circuit. This means that during peak load, the ORC unit cannot deliver sufficient heat. In this circumstance, the heat output of the heating device is increased towards its maximum output and at the same time the valve is opened to divert some of the first heat exchange fluid to the boost heat exchanger, so that further heat can be delivered to the third heat exchange fluid.

Alternatively, said auxiliary unit may comprise a thermal store comprising a tank to include said second heating system fluid heat exchange medium and adapted for connection to said second manifold. Optionally, said tank includes a tank heat exchanger forming said heat drain and adapted for connection to said first manifold and a thermal control unit comprising a thermostat to monitor the temperature of the second medium in the tank and a valve to limit flow of said first heat medium in the tank heat exchanger.

Alternatively, said auxiliary unit may comprise an absorption driven air conditioning unit comprising a heat pump forming said heat drain and adapted for connection to said first manifold and to be driven by said first heat exchange medium, and a source of refrigerant to be cooled by said heat pump.

Thus, in accordance with the present invention, a boiler unit can be supplied with or without an auxiliary unit, which can be supplied and fitted subsequently.

Indeed, in one arrangement, multiple slots or spaces could be provided in the boiler unit to accept multiple auxiliary units, each adapted to be driven by heat from the first circuit. Alternatively, one slot may be adapted to receive an ORC unit as described above and a second slot be adapted to receive an additional heat generation auxiliary unit, such as an ambient source heat pump, or a solar heat source, whereby the energy required to drive the ORC unit may be shared between the additional heat generation auxiliary unit and the first circuit.

Preferably, said boiler unit comprises a mount for fitment of said auxiliary control unit separate from said space.

Preferably, said first fluid heat exchange medium is water and steam operating under pressure and being gravity driven. Thus said boost heat exchanger, and the heat drain of said auxiliary unit when present, are above the heating device so that water in the heating device boils and turns to steam which rises to said boost exchanger where the steam condenses and falls back to the heating device as water. The pressure may be in the region of 6 or 7 Bar and the temperature of operation peaking at about 150° C.

In accordance with an aspect of the present invention there is provided and organic rankine cycle module comprising a control unit and a frame in which frame is mounted:
a third fluid heat exchange medium circuit, the circuit including a condenser adapted for connection to said second manifold to provide heat to said second circuit, a pump to circulate said third medium, an evaporator having ports connection of a source of a first fluid heat exchange medium to heat said third medium and a rotary expander connected to an electricity generator.

In accordance with a different aspect, there is provided a mounting in a frame for a vibrating unit having a longitudinal axis, the mounting comprising mounts on either side of said longitudinal axis in an axis plane and each mount lying in a mount plane substantially perpendicular said axis plane, wherein at least one mount comprises a pair of brackets, one unit bracket for fixed connection to the unit and the other frame bracket for connection in the frame, each bracket defining mounting faces that lie in bracket planes parallel said mount plane but spaced from one another, resilient blocks disposed between facing mounting faces the unit and frame brackets to support the unit in the frame when connected therein, wherein said mounting faces are inclined with respect to said mount frame and to said axis frame, whereby pairs of said resilient blocks on either side of said axis plane are inclined oppositely with respect to one another.

Preferably, the mounts are substantially identical on either side of an orthogonal axis plane being orthogonal said axis plane and containing said longitudinal axis, wherein pairs of said resilient blocks on either side of orthogonal said axis plane are inclined oppositely with respect to one another.

Preferably, there are pairs of said resilient blocks in a said mount on either side of a gravity plane being a plane orthogonal to each of said axis plane and orthogonal axis plane, said gravity plane being arranged to be substantially horizontal when the unit is mounted in the frame, wherein said pairs of said resilient blocks on either side of said gravity plane are parallel inclined.

BRIEF DESCRIPTION OF THE DRAWINGS

Embodiments of the invention are further described hereinafter with reference to the accompanying drawings, in which.

DETAILED DESCRIPTION

Figure 2A:
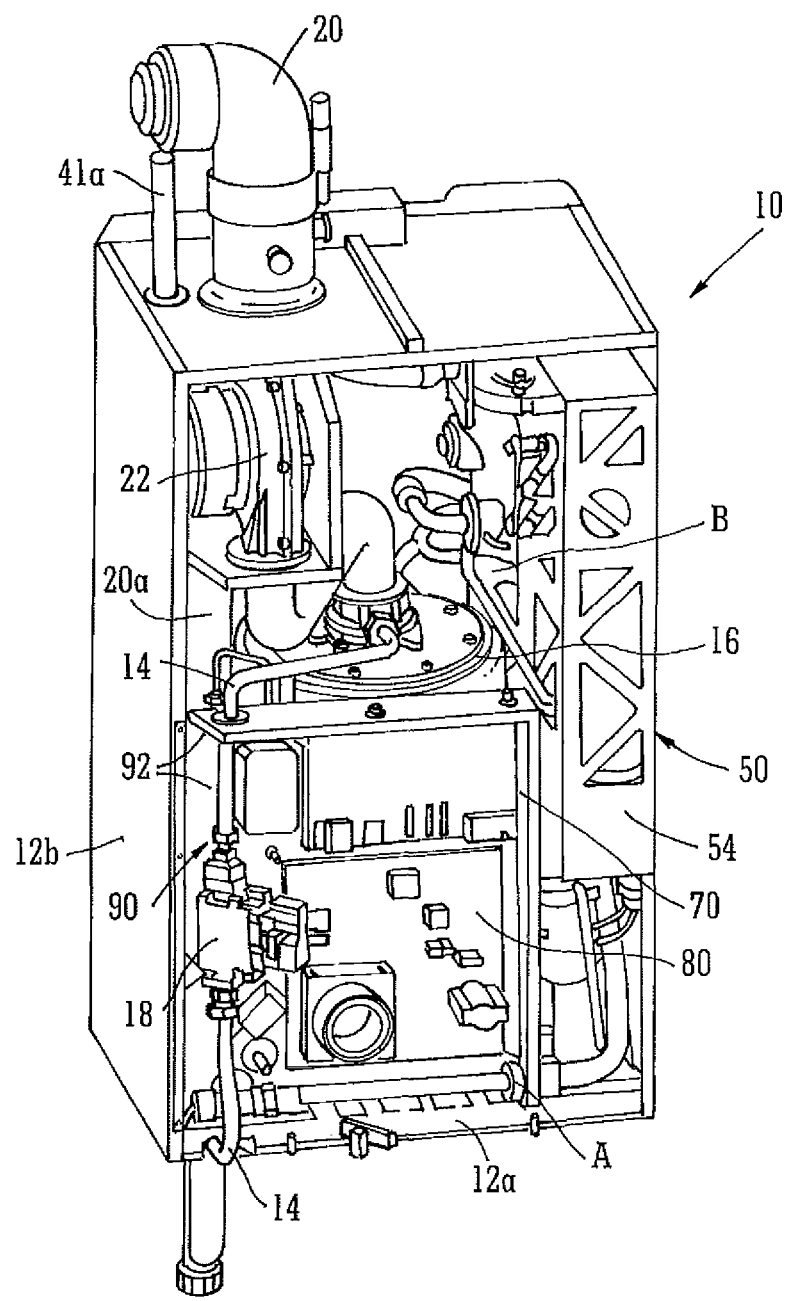
FIGS. 2a, b and c are views of a boiler unit incorporating the circuit of FIG. 1, with various panels removed.
Figure 2B:
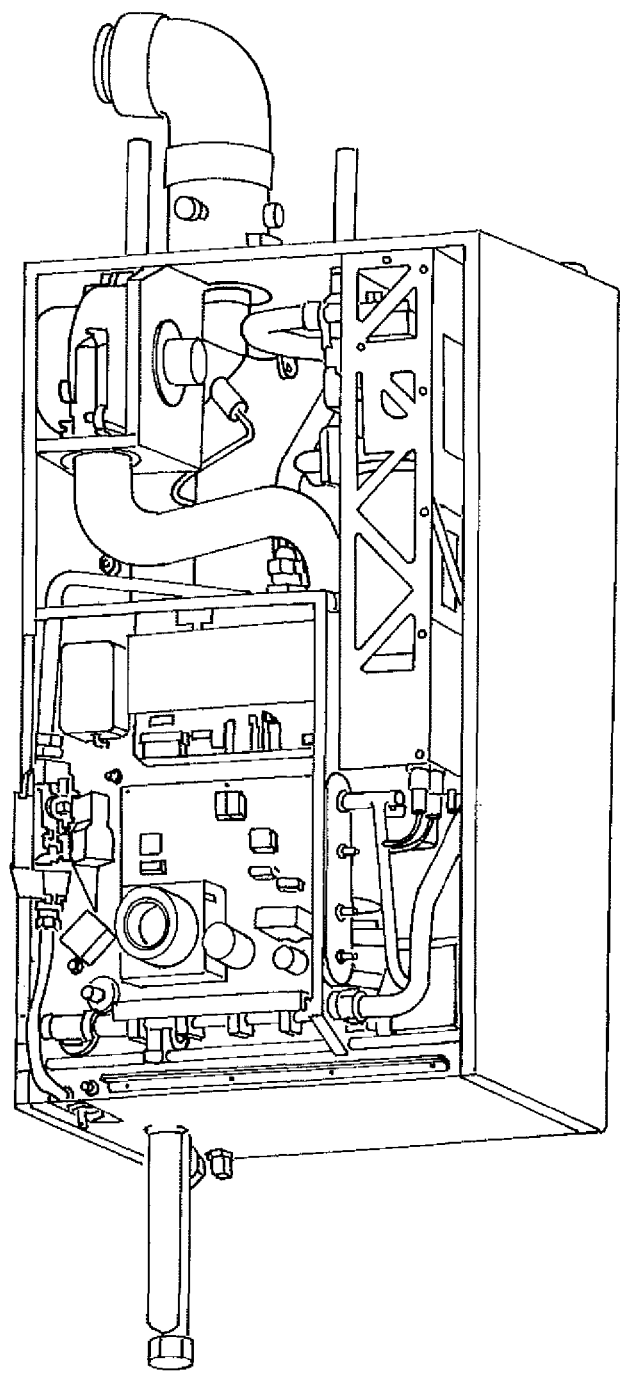
Figure 2C:
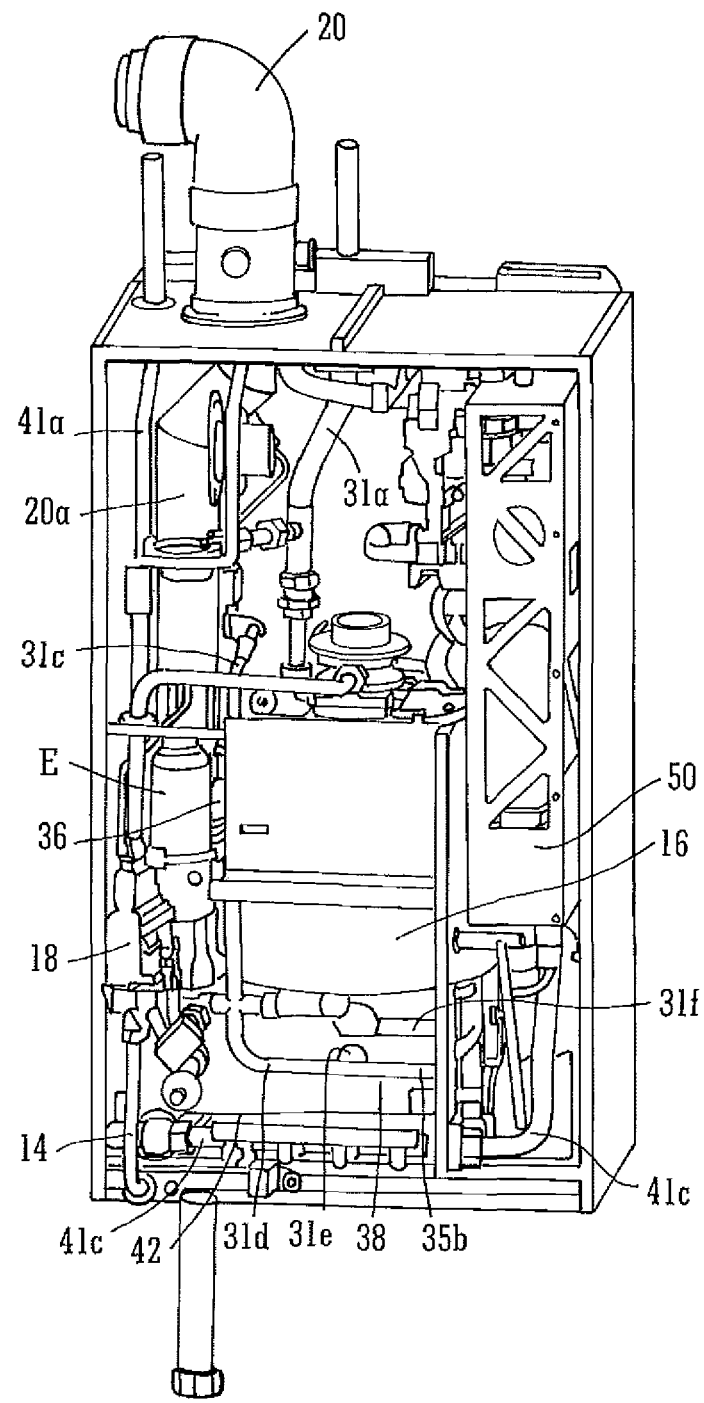
Figure 3:
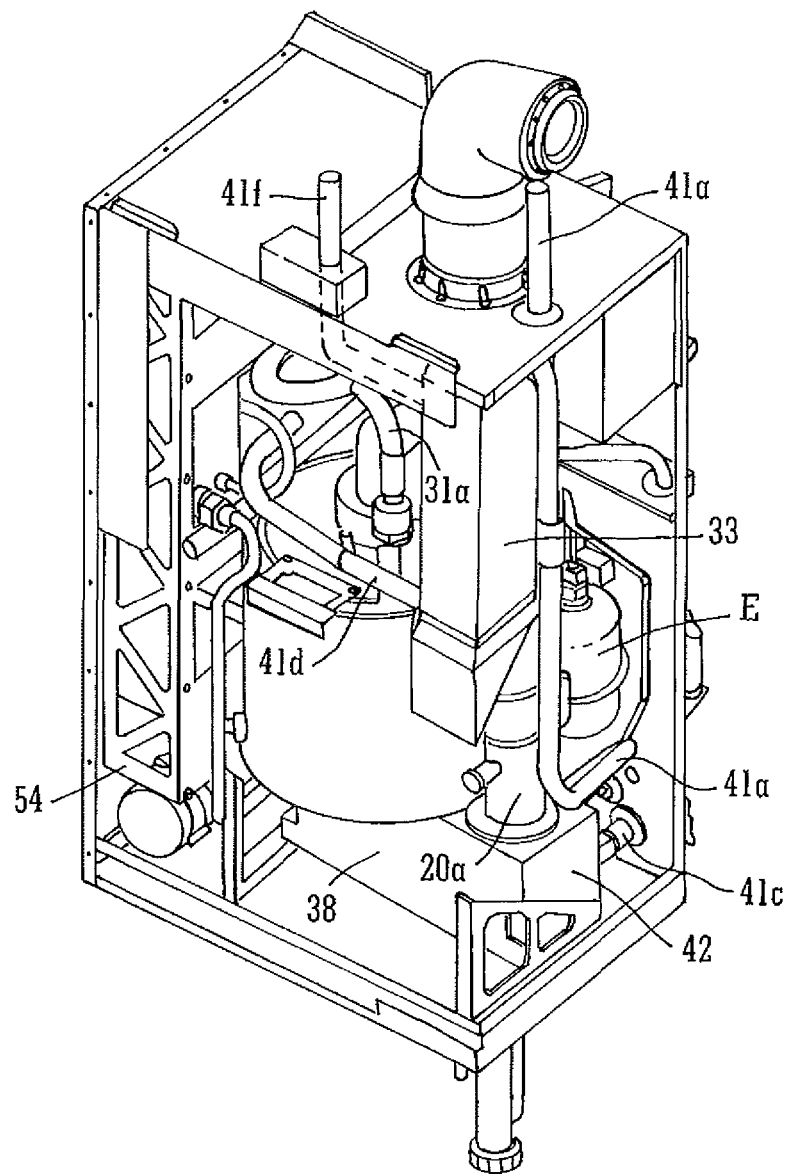
FIG. 3 is a further view with more panels removed

Referring to FIG. 2a, an embodiment 10 of a boiler in accordance with the present invention is a wall-mounted unit comprising a housing 12 in the form of a frame 12a and connected panels 12b, preferably forming a sealed enclosure when complete (some panels are not shown, including a front cover panel). Preferably, the boiler is gas fired, having a gas supply 14 to a combustion chamber 16 via a gas control vale 18. A balanced flue 20, driven by a fan 22, supplies combustion air to, and exhausts combustion gases from the combustion chamber 16.

The combustion chamber includes a primary heat exchanger HX (see FIG. 1) in the form of a coiled pipe inside the combustion chamber 16 that has a first heat exchange medium, most conveniently of water, which may be boiled and evaporated by the combustion process.

Figure 1:
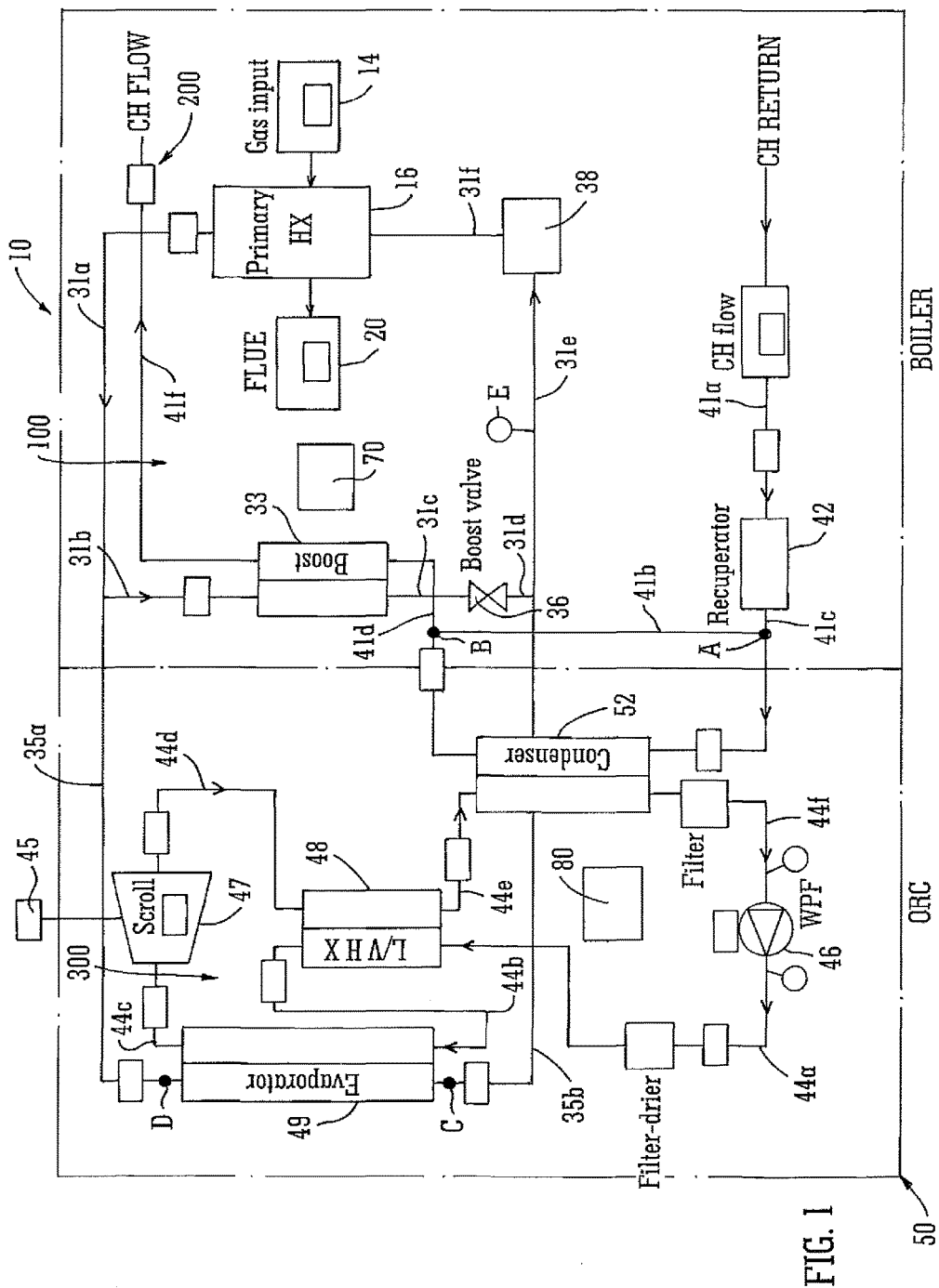
FIG. 1 is a fluid circuit diagram of a system according to the present invention.

Turning to FIG. 1, the boiler 10 comprises three fluid circuits, a first steam circuit 100, a second central heating (CH) and/or domestic hot water (DHW) circuit 200 and a third organic rankine cycle (ORC) circuit 300.

First circuit 100 comprises pipes 31*a-f*, which lead from the heat exchanger HX and complete the circuit through a boost heat exchanger 33. An expansion vessel E controls pressure in the first circuit. Motive force for the circuit is gravitational, since the steam rises from the combustion chamber 16 and condenses in the boost exchanger 33 which is at the top of the unit. In the embodiment shown, a branch 35*a* of steam pipe 31*a* leads to an evaporator 49 of an organic rankine cycle unit 50, described further below. A return branch 35*b* reconnects to the water return pipe 31*e*. A boost valve 36 controls flow through the boost exchanger 33. A recuperator 38 warms return water and cools exhaust gases exiting the base of the combustion chamber and exiting through flue root 20*a*.

Second circuit 200 comprises the boost exchanger 33 being supplied with a central heating (CH) and/or domestic hot water (DHW) from return pipe 41*a*. This first enters a recuperator 42 where exhaust gases leaving the combustion chamber 16 are finally cooled for exit through flue root 20*a* and some initial warmth is given to the return flow in pipe 41*a*. After exit from the recuperator, the return flow is in pipe 41*c*, which is connected to a condenser 52 in an ORC unit 50, described further below, assuming that is connected. When the ORC unit is not connected, instead, a bypass pipe 41*b* is connected to the exit of the recuperator 42, which bypass is also connected to the boost heat exchanger 33. If the ORC unit is present, exit pipe 41*d* from the condenser 52 connects instead to the boost heat exchanger 33. In either case, the circuit is completed by pipe 41*f* becoming the flow pipe of the central heating and/or how water system.

ORC unit 50 is a replaceable module having a frame 54 in which its components are mounted. The third ORC circuit consists of pipes 44*a-f*. Pipe 44*a* exits a pump 46 that delivers liquid organic heat exchange fluid (of which there are many available, although pentane is a suitable choice) to a regenerator 48 that heats the fluid a first stage. Exit pipe 44*b* delivers the warmer fluid to an evaporator 49 which adds further heat and boils the organic fluid under the influence of steam passing through the other side of the evaporator 49 in the steam circuit 100. The now vaporous organic fluid passes through pipe 44*c* to an expander 47, conveniently in the form of a scroll. The scroll may be connected to a generator 45. Indeed, the generator and scroll expander 47 may be integrated in a single unit 45/47, as it is in the embodiment illustrated in FIGS. 2 to 6. Pipe 44*d* carries still superheated but nevertheless expanded organic fluid vapour to the regenerator 48, giving up more heat before passing through pipe 44*e* to condenser 52 where its heat is largely given up to the central heating/hot water circuit 200 in condenser 52.

Thus the mode of operation and major transport of heat is from the combustion chamber to the steam circuit 100; from there to the ORC circuit 300 by exchange in the evaporator 49; and from the ORC circuit 300 to the central heating circuit 200 via the condenser 52. The bridge that circuit 300 represents between the steam circuit 100 and central heating circuit 200 is limited in its heat capacity. It may be limited by any of a number of the different components. The capacity of the circuit needs to be rated at a typical level that provides a) a useful quantity of electricity from the expander/generator 45/47 and b) provides most of the heat requirement for the CH/DHW circuit 200. However, it should not have any greater capacity than that, however, as efficiency is thereby compromised. However, in the event that more heat than the circuit 300 can provide is needed by the CH/DHW circuit, a boiler control unit 70 (discussed further below) opens the valve 36 and permits steam also to enter the boost heat exchanger 33 so that direct connection between the circuits 100,200 is achieved, as well as via the bridge circuit 300. Of course, as discussed above, if the ORC unit is not employed, then the boost heat exchanger is the only link between the steam and CH/DHW circuits 100,200.

Returning to FIGS. 2*a*, *b* and *c*, boiler control unit 70 is a typical such unit, controlling the operation of fan 22 and gas valve 18, as well as sensing various parameters to check for correct operation. It has a typical connection to a central heating system control unit (not shown) that is user operated to control on and off times and provide switching commands, responsive to room and water thermostats etc., to the control 70. However, when ORC unit 50 is installed, a separate ORC control unit 80 is provided and mounted in isolation unit 90. Isolation unit 90 is simply a location of the boiler 12 that is isolated from the combustion chamber 16 and ORC unit 50, whereby the electrical components of the boiler can be protected from the effects of both components. The isolation unit 90 is simply a surrounding wall 92 that divides the space inside the boiler enclosure 12. Pipes and electrical connections passing through the wall 92 pass through rubber grommets or the like. Control unit 80 controls the pump 46 and also distributes electricity generated by the generator 45.

Figure 4:
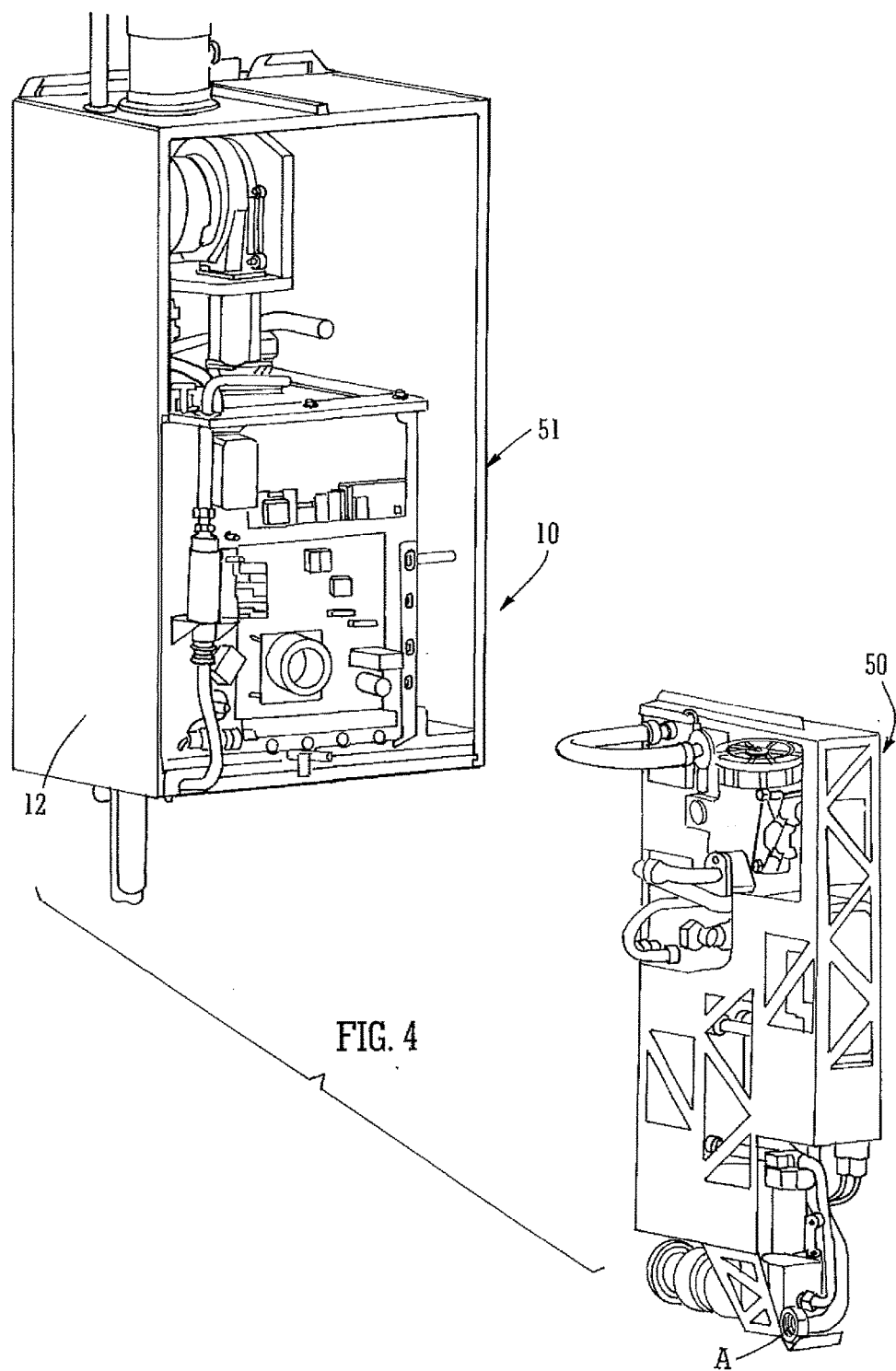
FIG. 4 is another view with an ORC unit detached from the boiler unit.
Figure 5A:
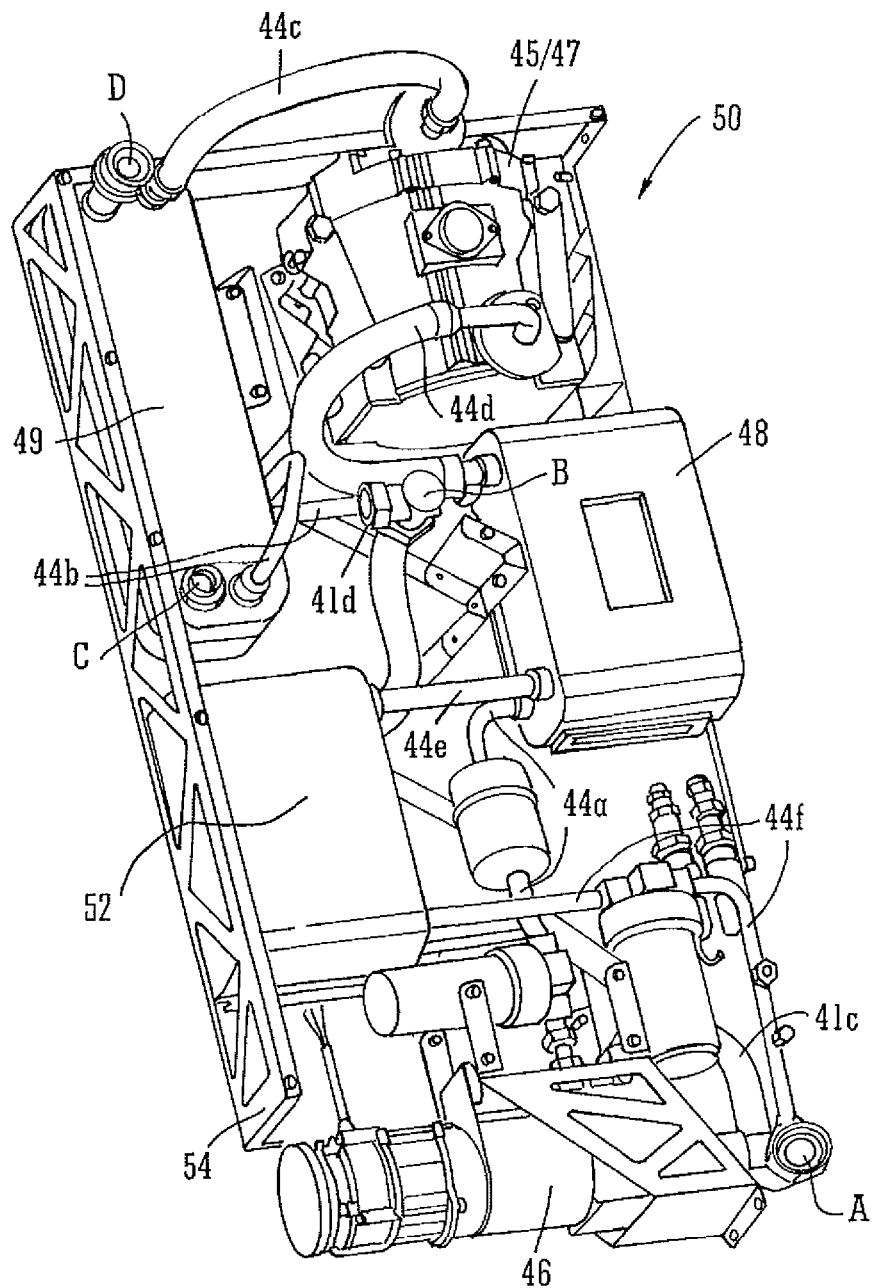
FIGS. 5a and b are views of the ORC unit with some frame elements removed.
Figure 5B:
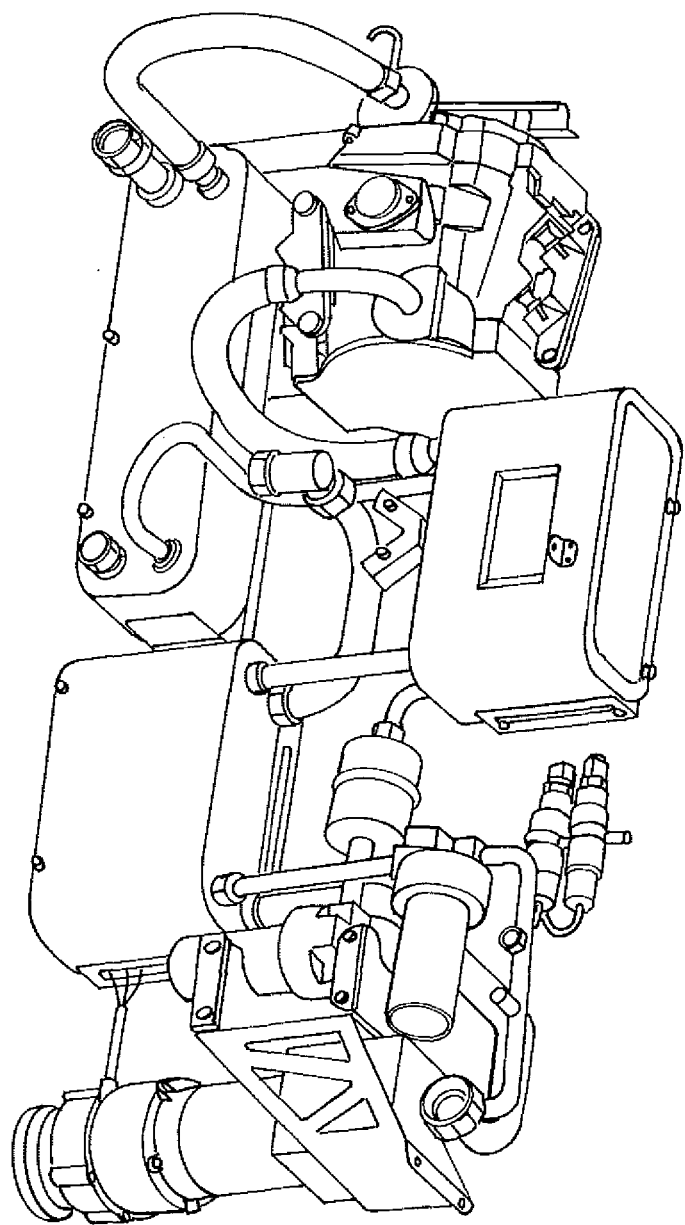

Turning to FIG. 4, the ORC unit 50 is a separate and separable component that simply plugs into the space 51 provided within the housing 12. As discussed above, the boiler 10 can be operated without the ORC unit in place. For that purpose, there needs to be connection and break possibilities between the circuits 100,200 and the ORC circuit 300. Thus, pipe 41*c* has connection A that is separable, as does pipe 41*d* at B. When the ORC is not present, connections A,B on the boiler side are simply interconnected by pipe 41*b* (not shown in FIG. 2). Pipes 35*a,b* that connect to the evaporator 49 simply use the connections C,D thereto as the beak points. In the event that the ORC is not present, these pipes are simply capped. Connections C and D form a first manifold, whilst connections A and B form a second manifold.

It is to be noted that a micro CHP unit such as disclosed in FIG. 1 has the capacity to function with or without the ORC unit. If it is not connected at all, the valve 36 is permanently open, and the combustion unit 16 can deliver all of its heat to the CH/DWH circuit 200 through the boost heat exchanger 30 which has sufficient capacity itself for this. When the ORC unit 50 is connected, the valve 36 is controlled by the ORC control unit 80 to close, whereby the heat is passed to the ORC unit where a proportion of its energy is converted to electricity. With the system being heat-led, the amount of electricity to be generated, which is generally in the ratio of 10:1 (heat:electricity), is entirely dependent on the heat load demanded by the CH/DHW circuit 200. However, should the demand reach the maximum capable of being delivered by the condenser 52, the ORC control unit begins to open the boost valve 36. This condition can simply be detected by measuring the temperature of the CH flow in pipe 41*f* when the ORC unit is fully operational. If this is less than required, then the valve 36 is progressively opened, diverting steam to the boost heat exchanger 33 and supplementing the heating of the CH/DHW circuit 200 from the condenser 52. For example, the heat capacity of the combustion chamber may be 18 KW. The rating of the ORC unit may be 12 KW, of which 10 KW is supplied to the condenser 52, 1 KW is lost as conversion losses, and 1 KW is generated as electricity. If, however, the heat demand of the CH/DHW circuit exceptionally exceeds 10 KW, then the valve 36 progressively opens. Thus, if the demand is 13 KW, then the combustion chamber may produce 15 KW, of which 3 KW is added directly at the boost heat exchanger and 10 KW at the condenser with 1 KW of electricity still generated. Also, the ORC control unit 80 is configured to open the valve 36 (or, rather, not prevent it from opening) when an error condition in the ORC unit 50 develops. Such may occur if, for example, the electricity grid faults and there is a requirement for the generation of electricity to cease. In the case of such a situation, the boiler can continue to function. This would have the effect of allowing the evaporator 49 to heat up by the passage of steam through it, with the result that there would be no steam condensation therein because of the lack of flow in the ORC circuit. Consequently, flow of water/steam (which is gravity driven as stated above) would cease in the pipes 35*a*,*b* and the ORC circuit 300 would be taken out of service.

Figure 6B:
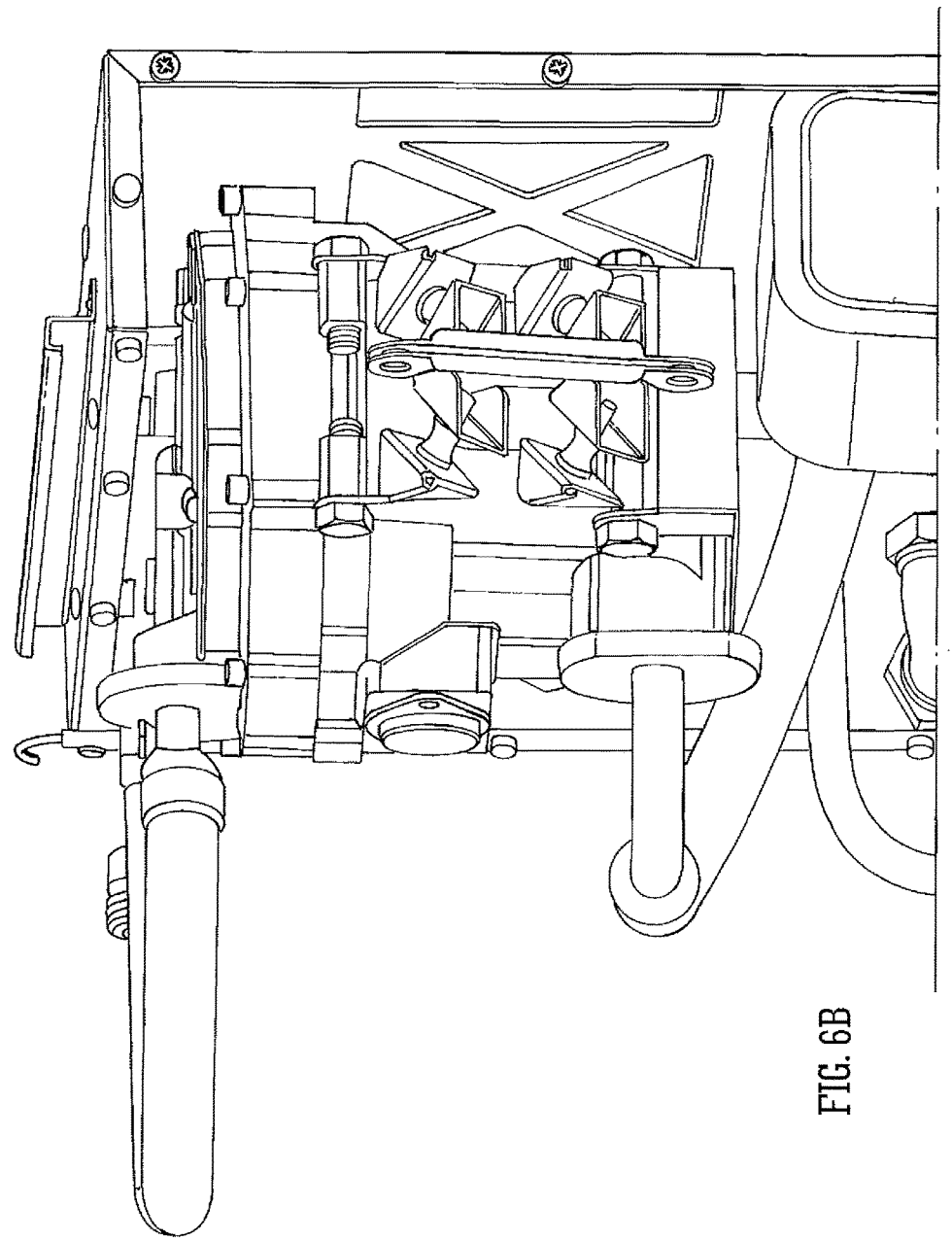
FIGS. 6a, b and c are views of a scroll expander generator arrangement in the ORC unit of FIG. 5 showing the mounting arrangements thereof.
Figure 6C:
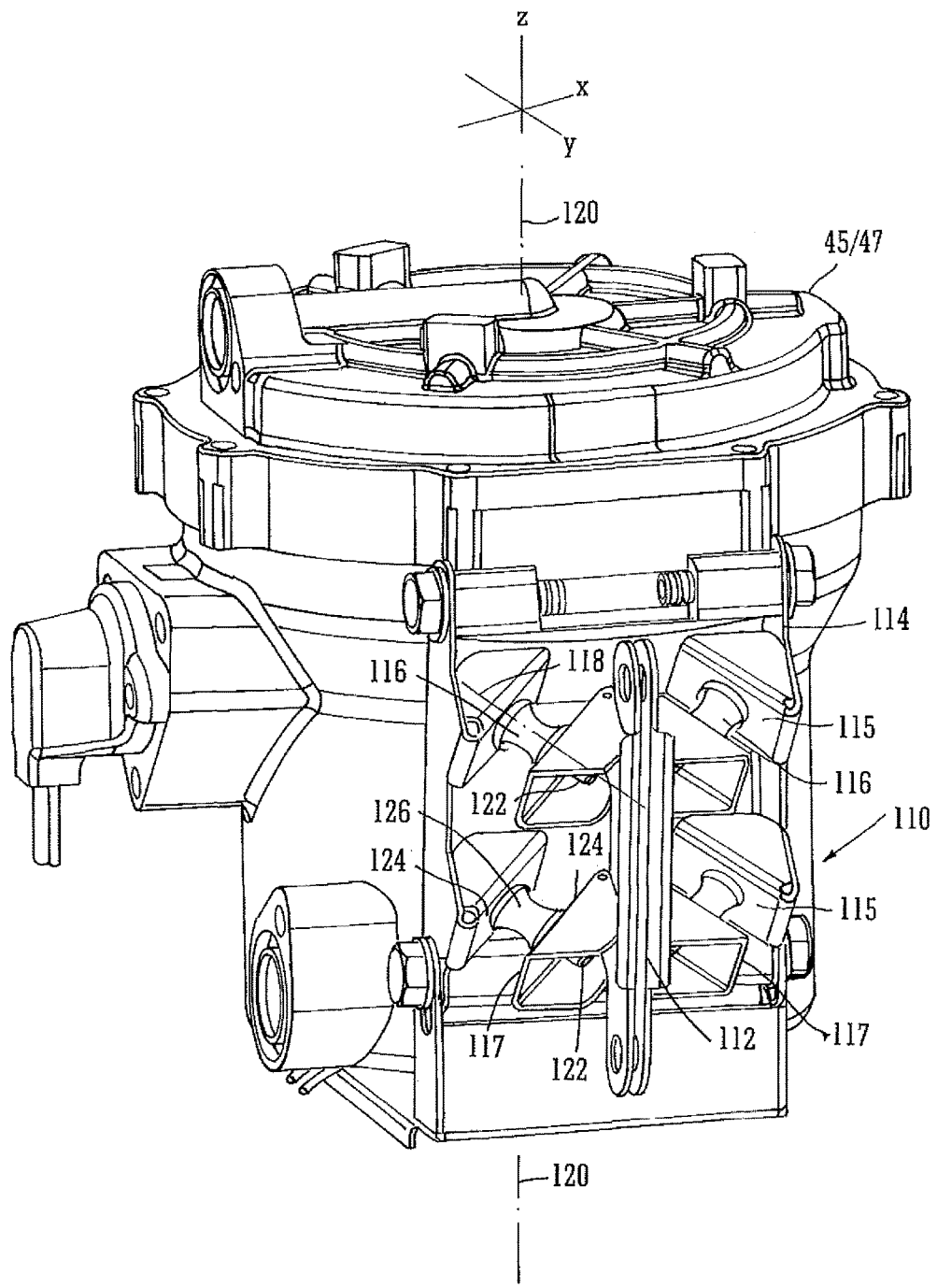

Turning to FIGS. 6*a*,*b* and *c*, the expander/generator unit 45/47 is mounted in the frame 54 through a resilient mounting arrangement. The expander is subject to periodic vibration caused by opening of each scroll leaf on each rotation. Such vibration cannot easily be avoided and needs damping. Moreover, the nature of the vibrations is not symmetrical. Finally, the unit 45/47 is relatively heavy and requires vibrational isolation from the remainder of the boiler unit to reduce noise and vibration transmission to the environment.

Accordingly, a mount 110 (see FIG. 6*c*) comprises first and second brackets 112,114, bracket 112 being essentially parallel a central axis 120 of the unit 45/47, which axis is that passing through the centre of gravity of the unit. A second mount (of two mounts 110,*a*,*b* in FIG. 6*a*) is arranged on the opposite side of the unit so that its bracket 112 is also parallel the axis 120 and substantially on the opposite side of it to the other mount. First bracket 114 is preferably that which is connected to the unit 45/47, whereas the second bracket is fixed to the frame 54. Each bracket 112,114 presents four mounting faces 115, each one disposed to be spaced from a corresponding face 117 on the other bracket and between which a progressive reaction rubber mount 116 can be arranged. The mounting 116 is well known and has a longitudinal 118 axis and a threaded stud 122 at each end that extends from a plate 124, the rubber 126 being adhered to each plate and extending between the plates 124.

Using the x,y,z co-ordinate system, where the z axis contains the axis 120 and the mounts 110*a*,*b* are spaced from each other in the z,y plane, the arrangement is such that the intersections of the axes 118 with the faces 115 of the bracket 114 all lie in a plane parallel the x,z plane. The same is true of the faces 117 of the bracket 112. However, such planes of intersection of the faces 115,117 (in respect of a given mount 110*a*,*b*) are spaced from each other in the y direction. Moreover, the faces 117 are in pairs on either side of the z,y plane, in a direction parallel the z axis. They are also in pairs on opposite sides of the z,y plane, in a direction parallel the x axis. Finally, the axis 118 of each pair of facing faces 115,117 is inclined with respect to all three planes, ie the zy, z,x and x,y planes. Indeed, preferably, they lie along lines parallel the line given by the equation $x=y=z$ or in directions perpendicular thereto.

The arrangement is such that the unit 45/47 is not rigidly mounted in any direction but has freedom of movement, that is to say is reliantly supported, in all directions in the x,y,z space. Thus considering any given orthogonal plane, x,y, x,z or zy, the mounting arrangement permits translational movement in the x, y or z direction, or rotational movement about the x, y or z axis in each plane, each movement leading to compression or extension of the rubber blocks 116.

Figure 7:
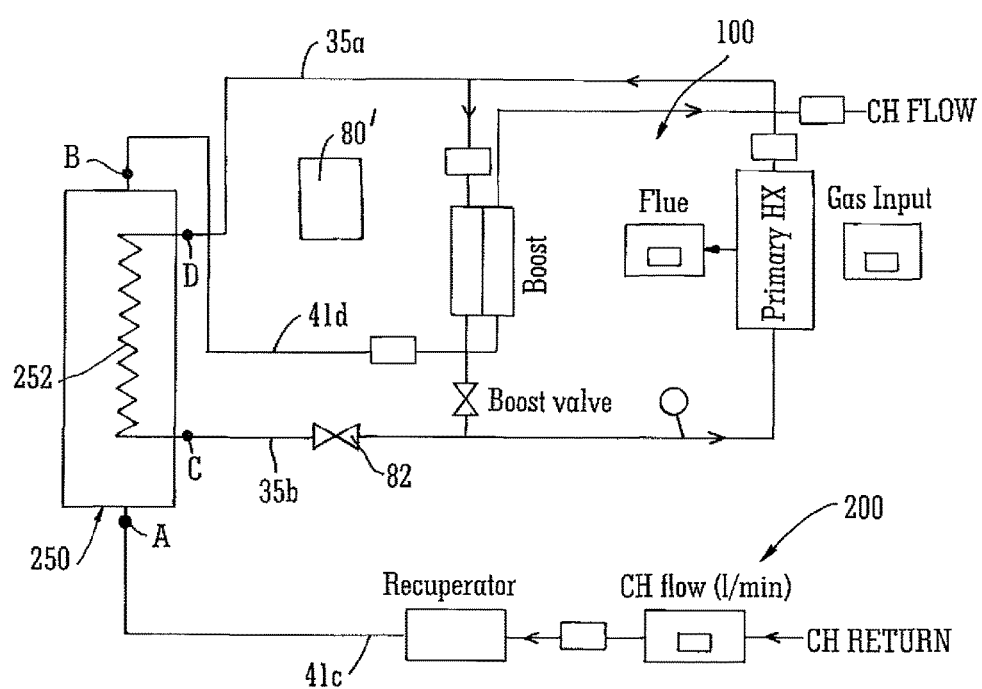
FIG. 7 is a schematic diagram of an alternative arrangement.

With reference to FIG. 7, the ORC unit of the previous embodiments is here replaced by a thermal store 250. Connection A of pipe 41*c* of the second CH/DHW circuit 200 is here connected to an inlet of the store 250 and connection B of pipe 41*d* is connected to the outlet of the store. Pipes 35*a*,*b* of the steam circuit 100 are connected to the ports C,D of a heat exchanger 252 in the store 250. If the temperature of the store falls below a set value, a thermal store control unit 80' opens a valve 82 to permit steam to heat the store 250.

Figure 8A:
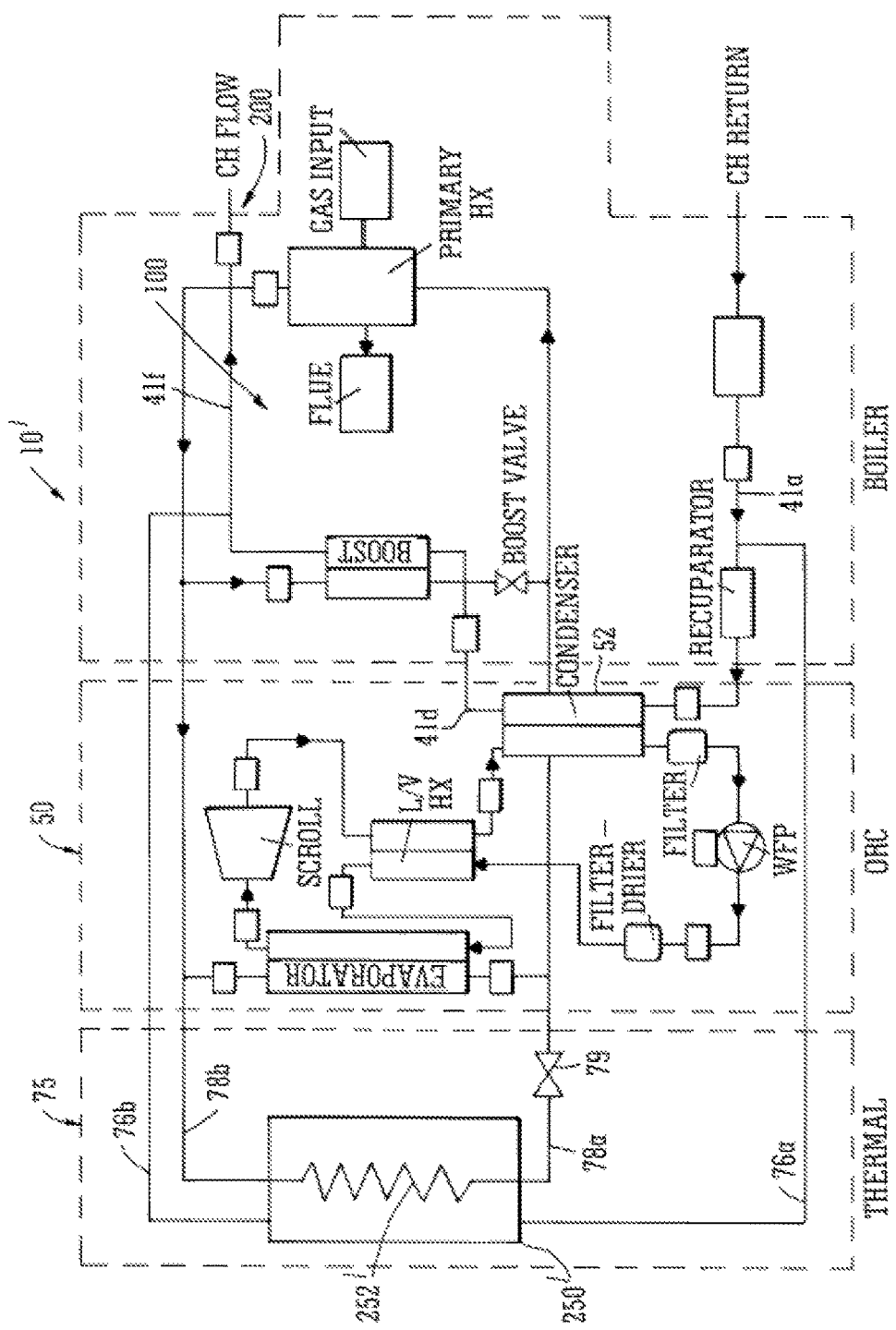
FIGS. 8a and b are schematic diagrams of alternative arrangements in accordance with the present invention.

In FIG. 8*a* boiler unit 10' includes the boiler circuits 100,200 discussed above and a slot to receive ORC unit 50, also as discussed above. However, a third "slot" 75 is provided. In this slot is disposed a thermal store unit in the form of a tank 250' which is supplied with connections 76*a*,*b* to the return and flow pipes 41*a*,*f* respectively. Moreover, the exchanger 252' has direct connections 78*a*,*b* to the steam circuit 100, a valve 79 controlling delivery of heat to the store 250'. Of course, if preferred, the heat exchanger 252' could simply be put in series with the condenser, in a diversion of pipe 41*d*.

Figure 8B:
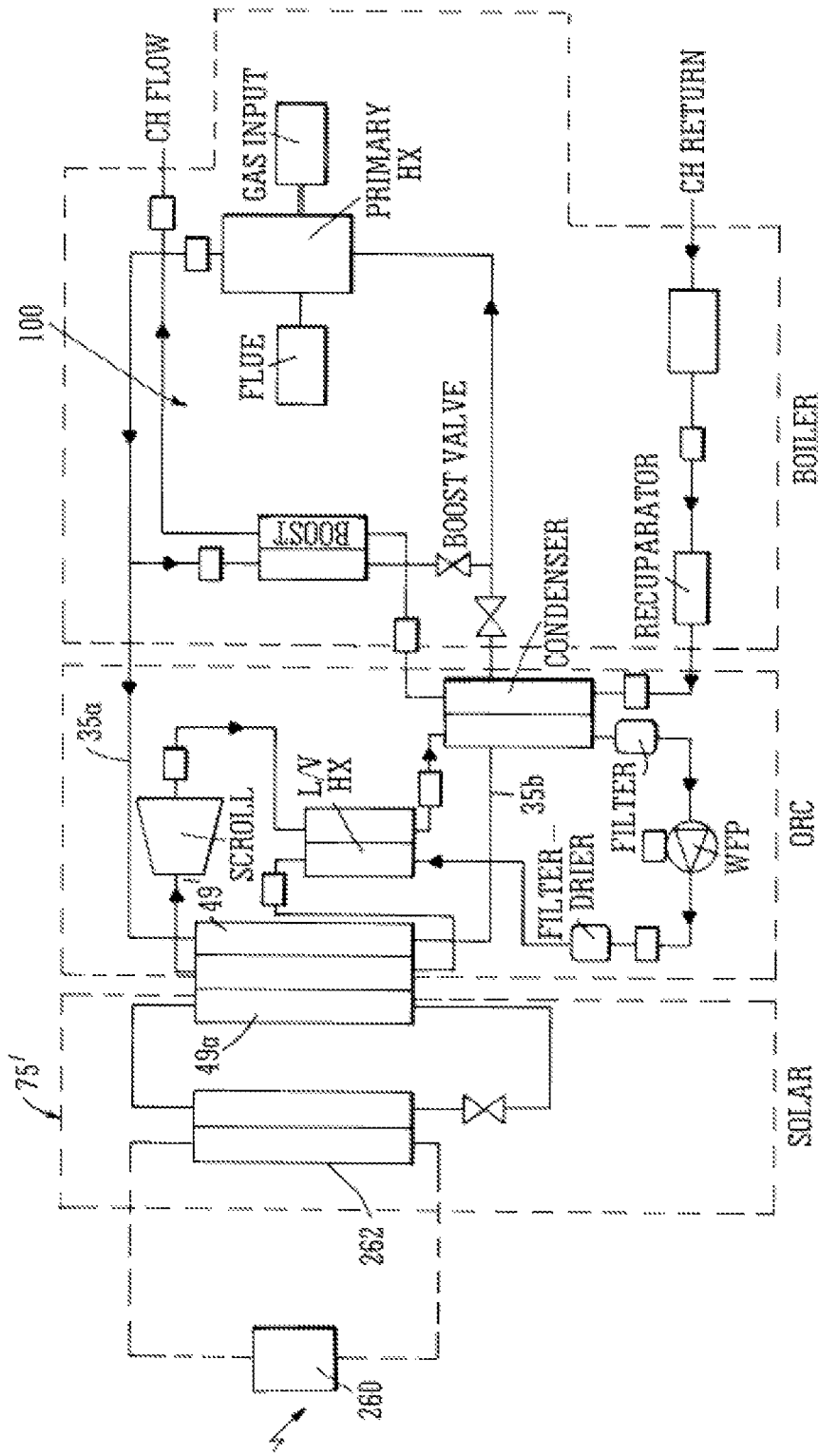

In FIG. 8*b*, the third slot 75' is here occupied by a solar heat generator. A solar panel 260 delivers hot solar heat exchange medium to a heat exchanger 262 which itself is arranged to deliver heat to a modified evaporator 49' that is capable to delivering heat to the ORC medium either from the steam circuit 100 through pipes 35*a*,*b*, as described above, or from the solar medium through extra panel 49*a* of the exchanger 49'. Alternatively, if the solar medium is hot enough, the heat exchange in exchanger 262 could be with water in branches of the pipes 35*a*,*b* in the water/steam circuit 100, whereby the exchanger 49' would be as described with reference to FIG. 1 or 8*a*.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A boiler unit comprising an enclosure including:
   (i) a first circuit of a first fluid heat exchange medium, the first circuit having:
      a heating device to heat the first fluid heat exchange medium;
      a first pair of connection points;
      a boost heat exchanger arranged in the first circuit in parallel to the first pair of connection points; and
      a valve arranged to control a flow of the first fluid heat exchange medium through the boost heat exchanger;
   (ii) a second circuit of a second fluid heat exchange medium, wherein the second fluid heat exchange medium is a heating system fluid exchange medium, the second circuit having:
      an output port and an input port of the boiler unit; and
      a second pair of connection points arranged in series in the second circuit;
   (iii) an auxiliary unit that is removably connectable to the first pair of connection points and the second pair of connection points such that the auxiliary unit is thermally drivable by the first fluid heat exchange medium and provides a thermal bridge between the first circuit and the second circuit; and
   (iv) a boiler control unit to control operation of the heating device;
   wherein:
   the boost heat exchanger is arranged to exchange heat between said first and second heat exchange media when said valve is open;
   the boiler control unit is adapted to control operation of the heating device according to heat demand upon the heating device, independently of operation of the auxiliary unit; and
   wherein said auxiliary unit further comprises an organic rankine cycle (ORC) unit comprising:
      a third fluid heat exchange medium circuit, the third heat exchange medium circuit including a condenser adapted for connection to said second pair of connection points to provide heat to said second circuit, a pump to circulate said third medium, an evaporator forming a heat drain and adapted for connection to said first pair of connection points to heat said third medium and a rotary expander connected to an electricity generator; and
      an auxiliary control unit to control the ORC unit and operate said valve.

2. A boiler unit as claimed in claim 1, wherein, when the auxiliary unit is not installed, the valve is arranged to be open, and, when the auxiliary unit is installed in said boiler unit, said auxiliary control unit is adapted to close the valve so that heat of the first fluid heat exchange medium can transfer to the third fluid heat exchange medium.

3. A boiler unit as claimed in claim 2, wherein, during operation of the boiler unit, the auxiliary control unit is adapted to open the valve when the ORC unit cannot meet all the heat demand of the second fluid heat exchange medium.

4. A boiler unit as claimed in claim 1, wherein said ORC unit comprises a mounting in a frame for a vibrating unit having a longitudinal axis, the mounting comprising mounts on either side of said longitudinal axis in an axis plane and each mount lying in a mount plane substantially perpendicular said axis plane, wherein at least one mount comprises a pair of brackets comprising a unit bracket for fixed connection to the unit and a frame bracket for connection in the frame, each bracket defining mounting faces that lie in bracket planes parallel said mount plane but spaced from one another, resilient blocks disposed between facing, mounting faces of the unit and frame brackets to support the unit in the frame when connected therein, wherein said mounting faces are inclined with respect to said mount plane and to said axis plane, whereby pairs of said resilient blocks on either side of said axis plane are inclined oppositely with respect to one another, said vibrating unit mounted in the frame being the rotary expander of the ORC unit.

5. A boiler unit as claimed in claim 4, wherein the mounts are substantially identical on either side of an orthogonal axis plane being orthogonal said axis plane and containing said longitudinal axis, wherein pairs of said resilient blocks on either side of said orthogonal axis plane are inclined oppositely with respect to one another.

6. A boiler unit as claimed in claim 4, wherein the pairs of said resilient blocks are in a said mount on either side of a gravity plane being a plane orthogonal to each of said axis plane and orthogonal axis plane, said gravity plane being arranged to be substantially horizontal when the unit is mounted in the frame, wherein said pairs of said resilient blocks on either side of said gravity plane are parallel inclined.

7. A boiler unit comprising an enclosure including:
   (i) a first circuit of a first fluid heat exchange medium, the first circuit having:
      a heating device to heat the first fluid heat exchange medium;
      a first pair of connection points;
      a boost heat exchanger arranged in the first circuit in parallel to the first pair of connection points; and
      a valve arranged to control a flow of the first fluid heat exchange medium through the boost heat exchanger;
   (ii) a second circuit of a second fluid heat exchange medium, wherein the second fluid heat exchange medium is a heating system fluid exchange medium, the second circuit having:
      an output port and an input port of the boiler unit; and
      a second pair of connection points arranged in series in the second circuit;
   (iii) an auxiliary unit that is removably connectable to the first pair of connection points and the second pair of connection point's such that the auxiliary unit is thermally drivable by the first fluid, heat exchange medium and provides a thermal bridge between the first circuit and the second circuit; and
   (iv) a boiler control unit to control operation of the heating device;
   wherein:
   the boost heat exchanger is arranged to exchange heat between said first and second heat exchange media when said valve is open;
   the boiler control unit is adapted to control operation of the heating device according to heat demand upon the heating device, independently of operation of the auxiliary unit; and
   wherein said auxiliary unit comprises an absorption driven air conditioning unit comprising a heat pump forming a heat drain and adapted for connection to said first pair of connection points and to be driven by said first fluid heat exchange medium, and a source of refrigerant to be cooled by said heat pump.

* * * * *